United States Patent Office 3,219,410
Patented Nov. 23, 1965

3,219,410
METHOD FOR RECOVERING HYDROGEN
FLUORIDE FROM WASTE GASES
Theodore H. Dexter, Lewiston, John A. Peterson, Niagara
Falls, and Joseph J. Wylegala, Grand Island, N.Y.,
assignors to Hooker Chemical Corporation, Niagara
Falls, N.Y., a corporation of New York
Filed May 23, 1962, Ser. No. 197,078
11 Claims. (Cl. 23—153)

This invention relates to the treatment and handling of waste gases resulting from the acidulation and/or calcination of phosphatic minerals to recover valuable products therefrom. More specifically, the present invention relates to methods for the treatment and handling of such waste gases, particularly those resulting from processes in the phosphorus and aluminm industries, so as to recover the fluorine content of such gases in an efficient and economical operation.

Furnace gases from the high temperature treatment of phosphate rock, as, for example, acidulation, processes for producing defluorinated phosphate rock for animal feed supplements, will contain fluorine values in low concentration. Additionally, other gases present will be nitrogen, oxygen, carbon monoxide, carbon dioxide, water and, possibly sulphur dioxide. Where the phosphate rock has been premixed with sulfuric acid to aid in defluorination, the $SO_2$ content of these furnace gases will be significant. In addition to these gaseous compounds, the gas stream also contains entrained finely-divided solids or dust. This dust is made up of silica, phosphate rock and acidulated rock products.

Before gases containing these components can be released to the atmosphere, the gas must be treated so as to render innocuous the toxic contaminants therein. Inasmuch as the treatment of these gases so as to make them suitable for release to the atmosphere is, of necessity, an expensive process, it is very desirable if the phosphate rock dust, fluorine compounds, and sulphur compounds can be recovered during the treating steps. In this manner, if these components are recovered in usable or salable form, a significant reduction in the overall expense of disposing of the gas is obtained.

Heretofore, many processes have been proposed for the recovery of the various components from such waste gas streams, particularly, fluorine values. All of these processes, however, have either been difficult or expensive to operate or have resulted in the production of the by-product in a form which is not readily usable or salable. For example, with respect to the recovery of fluorine values, many of the prior art processes have recovered fluorine in the form of fluosilicic acid. Inasmuch as the market price for this material is generally low, such processes are not economically attractive. Accordingly, the recovery of the fluorine values as, for example, HF which commands a higher price, is more desirable.

It is, therefore, an object of the present invention to provide methods for the treatment and handling of waste gases resulting from the acidulation and/or calcination of phosphatic material to recover valuable products, particularly, hydrogen fluoride.

Another object of the present invention is to provide an improved process of the type described wherein the flourine content of such waste gases, as well as the finely-divided phosphate rock, silica values, and sulphur-containing gases, are recovered in an efficient and economic operation.

These and other objects will become apparent to those skilled in the art from the description of the invention which follows.

In the drawings which are attached hereto and form a part hereof, FIGURE 1 is a schematic representation of the flow process of the present invention to form a concentrated HF solution.

Figure 1:
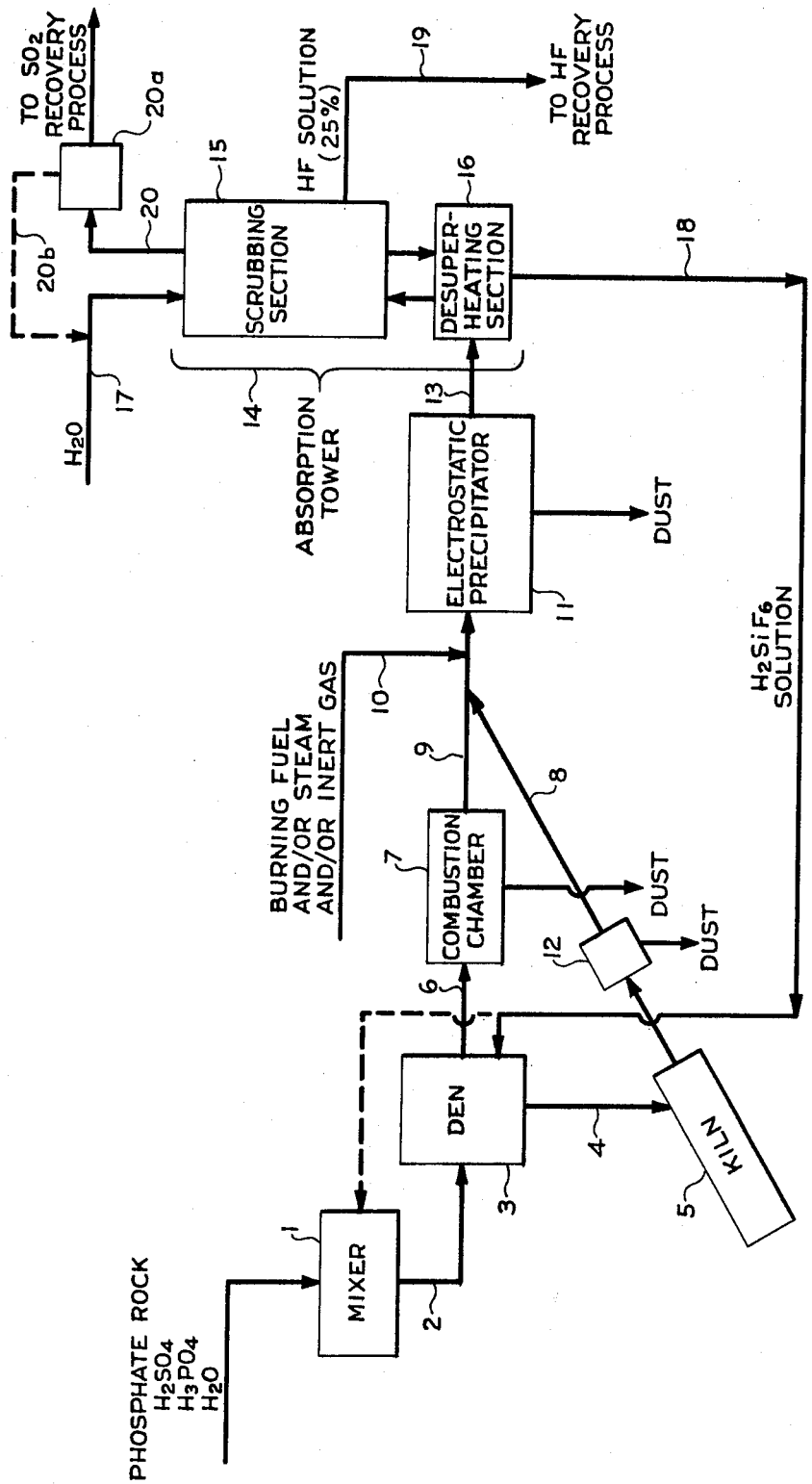

The process of the present invention envisions treating a gas stream which contains, in minor amounts, fluorine values, silica values, and suspended solid impurities, to correlate the gas temperature, water concentration and total fluorine concentration of said gas stream, so as to obtain a high molar ratio of HF to $SiF_4$ in the gas, separating substantially all of the suspended solid impurities from said gas stream with no appreciable variation in the adjusted temperature, water concentration and total fluorine concentration of the gas, which would result in a reduction of HF to $SiF_4$ ratio obtained, and, thereafter, separating the fluorine values in said gas streams from the major portion of said steam, preferably, by scrubbing the gas stream with an aqueous solution and utilizing the sensible heat of said gas to form a concentrated solution of hydrogen fluoride.

More specifically, in the present process, waste gases resulting, for example, from the acidulation and/or calcination of phosphatic materials, are treated so as to obtain a maximum molar ratio of hydrogen fluoride to $SiF_4$ in the gas. This gas stream contains, in minor amounts, fluorine values and silica values, as well as solid suspended matter. While it has been suggested that these waste gases may result from the acidulation and/or calcination of phosphatic materials, it is to be understood that gases from any other suitable systems may also be treated by the present processes. The only requirement of the system is that it produce gases of the type hereinafter described.

The treating or conditioning of such a gas so as to obtain a high molar ratio of hydrogen fluoride to $SiF_4$ involves adjusting the temperature of the gas, the water concentration of the gas, and the total fluorine concentration of the gas. When all of these factors have been properly correlated, the desired higher molar ratio of hydrogen fluoride to $SiF_4$ is obtained. It has been found that as the temperature of the gas in increased, the molar ratio of HF to $SiF_4$, likewise, increases. Similarly, as the water concentration in the gas stream is increased, the molar ratio of HF to $SiF_4$ increases. With regard to the total fluorine concentration of the gas, however, the converse is true; that is, as the total fluorine concentration decreases, the molar ratio of HF to $SiF_4$ increases. It is to be appreciated that, where the proper correlation of the above factors is not obtained, and a sufficiently high molar ratio of HF to $SiF_4$ is not achieved, it is extremely difficult, if not impossible, to obtain a good separation of the hydrogen fluoride from the gas stream.

Once the desired high molar ratio of HF to $SiF_4$ has been obtained in the gas stream, removal of the suspended solid impurities from the gas stream is effected. The removal of these suspended solid impurities may be accomplished in any desired manner, the only requirement being that there is substantially no change in the gas temperature, water concentration and total fluorine concentration of the gas, as previously adjusted which would cause a reduction in the molar ratio of HF to $SiF_4$. Removal of this solid material by means of electrostatic precipitation has been found to be very satisfactory, and, for this reason, is a preferred method for use in the present process. Other removal methods, however, such as by filtering, may also be used with equally good results. Again, it must be emphasized that whatever process is used for removing the suspended solid impurities, it is important that this process does not cause any appreciable variation in the previously adjusted gas temperature, water content, and total fluorine content which would result in a reduction of HF to $SiF_4$ molar ratio.

Once the solid matter has been removed from the gas, which matter is predominantly finely-divided silica, rock dust and the like, the fluorine values in the gas stream, as hydrogen fluoride, are then separated from the major portion of the gas stream. This separation, preferably, is accomplished by contacting the gas stream with an aqueous solution, preferably, water whereby substantially all of the hydrogen fluoride in the gas stream is absorbed in the water. This contact of the gas stream and the aqueous solution is, preferably, carried out in an absorbing or scrubbing tower so that the hot gas stream entering the bottom of the tower is contacted with an aqeous solution which contains the absorbed hydrogen fluoride. In addition to the hydrogen fluoride in the gas stream, any $SiF_4$ will also be absorbed by the aqueous scrubbing liquor. However, by maintaining the incoming gas stream at an elevated temperature, the sensible heat of this gas is utilized to effect a refluxing or fractionation of the scrubbing liquor so that a relatively concentrated solution of fluosilicic acid, containing only minor amounts of hydrogen fluoride, can be removed from the bottom of the scrubbing tower. The major portion of the absorbed hydrogen fluoride, because of this refluxing or fractionating operation, is then removed from an intermediate portion of the tower as a relatively concentrated solution, e.g., up to about a thirty-eight percent aqueous solution of hydrogen fluoride, which is the concentration of the azeotropic mixture. This hydrogen fluoride solution, which generally has a much higher concentration, e.g., twenty five to thirty-five percent than can normally exist in direct equilibrium with the entering gas stream, may then be subjected to additional processing to obtain substantially anhydrous hydrogen fluoride. The remainder of the gas stream, after passing in contact with the aqueous scrubbing medium, is found to be substantially free of hydrogen fluoride. This gas stream may then be discharged to the atmosphere, or where it contains appreciable quantities of $SO_2$, it may be sent to additional processing to recover the $SO_2$. The fluosilicic acid solution containing some hydrogen fluoride, which is recovered from the bottom of the scrubber or absorber, may be recycled to the calcination or adiculation portion of the process.

As has been indicated hereinabove, the concentrated aqueous solution of hydrogen fluoride may be subjected to further processing so as to obtain a substantially anhydrous HF gas. For example, solid alkali metal fluoride may be contacted with the aqueous solution of hydrogen fluoride, preferably, adiabatically, so as to obtain an alkali metal bifluoride. This material can then be heated to above its decomposition temperature to obtain substantially anhydrous hydrogen fluoride gas and the alkali metal fluoride, which latter material can be recycled in the process. In such a process, the aqueous hydrogen fluoride solution is partially vaporized and brought into contact with a moving bed of sodium fluoride. The proportion of liquid to vapor feed is adapted so that a heat balance is established wherein the heat evolved by the reaction of the sodium fluoride and the hydrogen fluoride is equal to the heat absorbed by the vaporization of the liquid water in the hydrogen fluoride solution feed. Such an adiabatic operation is advantageous in that it permits the use of much smaller and, thus less expensive equipment because the large heat transfer surface to vaporize an all-liquid feed or to dissipate the heat of reaction of an all-vapor feed is not needed. Additionally, much higher rates of throughput also are made possible by the substantially "automatic" temperature control which is embodied in this process.

In an alternative process for recovering HF from the concentrated aqueous HF solution, the HF solution is admixed with an alkali metal fluoride, preferably, slurried in an alkali metal bifluoride solution, to produce an alkali metal bifluoride slurry. This slurry is then centrifuged and a wet cake of alkali metal bifluoride is obtained, which cake is then heated to a sufficiently high temperature to drive off the water. The thus-dried alkali metal bifluoride cake is then heated to a temperature above its decomposition temperature so as to evolve substantially anhydrous HF gas and solid alkali metal fluoride. Such a process is advantageous in that by forming the alkali metal bifluoride by precipitation, separation of the HF values from the soluble impurities is obtained. Additionally, such a process is applicable to a wide concentration range of HF aqueous solutions.

It is to be understood that the above processes for recovering substantially anhydrous HF gas from the aqueous HF solution are merely exemplary of those which may be used and that other processes for this purpose will be apparent to those skilled in the art. It is to be further appreciated that, as used in the description of the invention and claims, the term "alkali metal" is intended to refer to sodium, potassium, lithium, cesium and rubidium. However, because of the low cost and ready availability, the preferred alkali metals for use in the present method are sodium and potassium. Accordingly, hereinafter, primary reference will be made to these materials and, particularly, to sodium.

Considering now the treatment of the waste gas stream prior to the removal of the solid suspended impurities so as to adjust the temperature, water concentration and total fluorine concentration, this treatment does not involve merely a simple juggling of these factors so as to arrive at the most advantageous conditions. It has been found that in the case of each of these variables, there are definite limitations in the amount of adjustment which can be made and still obtain an operable process.

Considering first the total fluorine concentration of the gas stream, as has been set forth hereinabove, the molar ratio of HF to $SiF_4$ increases as the total fluorine concentration in the gas stream decreases. It has been found, however, that the total fluorine concentration in the gas stream as HF should, preferably, not be substantially less than about 0.05 percent by volume with a concentration not less than about 0.5 percent by volume being specifically preferred. Where the total fluorine concentration in the gas steam is appreciably below this amount, the size of the apparatus for the subsequent scrubbing operation will be appreciably increased so that it is not possible to operate the present process efficiently and economically. Accordingly, it is apparent that although a decrease in total fluorine concentration results in the increase of the molar ratio of HF to $SiF_4$, it is not possible to reduce the total fluorine concentration of the gas indefinitely so as to obtain a desirable high molar ratio of HF to $SiF_4$.

With regard to the molar of HF to $SiF_4$ which is desired in the gas stream, it has been found that at the point in the process wherein the suspended solid impurities are removed from the gas stream, by electrostatic precipitation or other suitable means, the molar ratio of HF to $SiF_4$ cannot be substantially less than about 5:1. While operation of the present process is possible using this ratio, higher molar ratios, as, for example, 25:1 or greater, are desirable, with a ratio of at least 50:1 being preferred. Where a high HF to $SiF_4$ ratio in the gas is maintained, at the point in the process where the solid impurities are removed from the gas stream, substantial quantities of the silica values in the gas are converted to solid $SiO_2$, which material is separated as a solid impurity. By removing substantially all of the solid $SiO_2$, the scrubbing of the resulting gas stream produces an aqueous HF solution having a very low Si content. From this, it is believed to be obvious to those skilled in the art that where lower molar ratios of HF to $SiF_4$ are maintained in the gas stream, much larger quantities of Si values will be retained in the gas stream, which Si values will appear as increased fluosilicic acid recycle.

With regard to the gas stream temperatures to be used, it has been found that the temperature must be in excess of about three hundred degrees Fahrenheit. This is because at lower temperatures, it is not possible to obtain the necessary HF to $SiF_4$ ratio, even when using the minimum total fluorine concentration and maximum $H_2O$ content in the gas. As has been pointed out hereinbefore, the total fluorine concentration of the gas stream must be at least 0.05 percent in order to have an economically feasible operation of the scrubbing portion of the process. Accordingly, for the present process to be operable, it is necessary that the temperature of the gas stream be adjusted so as to be in excess of about three hundred degrees Fahrenheit, and, preferably, in excess of about eight hundred degrees Fahrenheit. As to the maximum temperature which may be used in the process, this will, of course, depend upon the materials of construction of the various apparatus components used. While, obviously temperatures sufficiently high to cause molecular dissociation of the hydrogen fluoride could not be used, temperatures up to this value can be used, with the higher temperatures being more advantageous in terms of the HF to $SiF_4$ ratio of the gas stream. As a practical maximum temperature, however, it has been found that at temperatures substantially in excess of about one thousand degrees Fahrenheit, some difficulties are encountered in some of the process apparatus. This has been found to be particularly true when an electrostatic precipitator is used for the removal of the suspended solid impurities from the gas stream. The operating efficiency of the electrostatic precipitators which are presently commercially available decreases considerably when temperatures substantially in excess of about one thousand degrees Fahrenheit are used. Accordingly, it it preferred in the operation of the present process that temperatures in excess of this value not be used.

With regard to the water concentration of the gas stream being treated, it has been found to be extremely advantageous that comparatively large concentrations of water are present. It has been found that the presence of water vapor in the gas stream causes dissociation of the $SiF_4$ which is present to solid $SiO_2$ which is removed in the electrostatic precipitator, thereby increasing the HF to $SiF_4$ ratio. Accordingly, it is preferred that the concentration of water in the gas stream should be at least about five to ten percent by volume of the gas stream. Preferably the water concentration is even higher, e.g., twenty to thirty percent by volume, with concentration as high as seventy-five percent by volume, not being inoperable. The water in the gas stream will, of course, be in the form of steam, in view of the high temperatures which are used in the process.

It must be emphasized, at this point, that although the total fluorine concentration of the gas stream and the temperature of the gas stream are both important factors in the operability of the present process, it is the use of a comparatively large volume of water in the gas stream which makes the process feasible. The finding that there is a dissociation of the $SiF_4$ in the presence of large amounts of water vapor in the gas stream makes it possible to obtain a sufficiently high HF to $SiF_4$ ratio as is required for the subsequent scrubbing operation, while still making it possible to operate the process at a reasonable temperature.

It is to be appreciated that in the operation of the subject process for the recovery of a concentrated aqueous solution of hydrogen fluoride, it is not simply a matter of operating the process at an optimum temperature, water concentration and total fluorine concentration in the gas stream. There is yet another factor which must be considered. This factor involves the recycle of the fluosilicic acid, saturated with hydrogen fluoride, which is obtained from the bottom of the scrubbing tower.

It is believed to be quite apparent that as this material is recycled in the process, there will be an increase in the total fluorine concentration and, hence, a decrease in the HF to $SiF_4$ ratio. This decrease in the HF to $SiF_4$ ratio in the gas stream being treated will cause a corresponding increase in the size of the fluosilicic acid-HF solution recycle stream. The size of this recycle stream will then continue to increase until all of the fluorine in the incoming gas goes into the recycle, thus making the process inoperable. It is, therefore, necessary that the process be operated under such conditions that a stable recycle stream will be obtained. Generally, it is preferred that the ratio of fluorine in the recycle stream to each pound of fluorine recovered is not substantially in excess of about 0.4:1. Although higher ratios can be used, e.g., 0.8–0.9:1, and still maintain an operable process, these higher ratios are not economically preferred. Accordingly, insofar as the economics of the process are concerned, the lower the amount of fluorine in the recycle stream, the better, with a ratio of less than 0.15:1 being specifically preferred.

Considering now that portion of the process wherein the fluorine values, as HF, are recovered from the gas stream, following the conditioning thereof and once the solid impurities have been removed, the gas stream is brought into a scrubbing or absorbing tower. Although it is preferable that there is no substantial variation in the adjusted temperature, a decrease in temperature, to about six hundred degrees Fahrenheit, can be tolerated. The scrubbing system which is used in this operation is constructed so as to provide a multiplicity of transfer units or plates. The amount of water which is passed through the scrubbing apparatus in a continuous scrubbing operation is sufficient both to cool the gas by evaporation, as well as to provide for the solution of the fluorine compounds. Depending on the gas composition and temperature, the water supplied for the evaporative cooling may be many times that contained in the solutions which are removed from the scrubbing apparatus. As the required water supply is run through the scrubbing system, countercurrent to the gas stream, because of the multiplicity of transfer units in the scrubber, concentration gradients in the aqueous solutions of fluorine compounds occur along the absorption apparatus. In this manner, essentially all of the silicon is drawn out of the system from the area of initial contact with the gas stream as a solution of water, fluosilicic acid and hydrofluoric acid. Additionally, most of the hydrogen fluoride is drawn out of an intermediate section of the scrubbing apparatus as a solution of hydrofluoric acid and water containing only small amounts of dissolved silicon. In this process, not only is there a separation of fluosilicic acid from substantially all of the hydrofluoric acid, but, additionally, the fractionating action in the scrubber also gives these fluorine containing solutions a far higher concentration than would normally exist in direct equilibrium with the entering gas.

Both the separation of the fluosilicic acid from the hydrofluoric acid and the production of high concentration solutions are beneficial in the present process. For example, a high concentration of hydrofluoric acid in water is less expensive to dehydrate for sale as anhydrous hydrogen fluoride than a less concentrated solution. Similarly, a strong solution of fluosilicic acid is preferred over a dilute solution either for processing to fluosilicates or fluorides, or even when used for a recycle back into the phosphate rock acidulation process as has been suggested hereinabove.

It is to be noted that once the gas stream has passed through the scrubbing apparatus, substantially all of the fluorine values as hydrogen fluoride, have been removed therefrom. The remaining gas stream may then, if desired, be discharged to the atmosphere with substantially no problems of atmospheric contamination. In the event that appreciable quantities of sulphur dioxide are present in the gas stream, recovery of this material may be had by passing the gas stream from the scrubber to suitable processes for the recovery of $SO_2$.

In regard to this gas stream which has passed through the scrubbing apparatus, it is, of course, apparent that it contains large quantities of water. It has been found to be advantageous in the present process if this water is in part condensed out of the gas stream and used as the source of water which is supplied to the scrubbing system. Such a step is particularly desirable when the gas is to be subjected to additional processing to remove the $SO_2$. Moreover, this step is also advantageous in that it provides an additional transfer unit or plate for the scrubbing operation, thus giving additional scrubbing action. This condensation of the water in the tail gas from the scrubber may be accomplished using any suitable heat exchange means.

As has been indicated hereinabove, the concentrated aqueous solution of hydrofluoric acid which is recovered during the scrubbing operation may be subjected to processing to recover substantially anhydrous hydrogen fluoride. Examples of two such additional processes which may be used have been given, although other processes may be used with equally good results. Alternatively, the concentrated aqueous solution of hydrofluoric acid may be recovered as such, either for sale or for use in other processes, as, for example, in liquid phase fluorinations.

Referring now to the drawings, as is shown in FIGURE 1, phosphate rock, sulfuric acid, phosphoric acid, and water are fed into a mixer 1 in which they are intimately mixed for chemical reaction. From the mixer, the reaction mix is delivered by a conveyor or conduit 2 to a den 3. The den serves as a holding means for permitting completion of the reaction between the materials which are fed to the mixer. After substantial completion of the reaction in the den, the mixed material is fed through a conduit or conveyor 4 into a kiln 5. The kiln may be a direct fired countercurrent rotary kiln as shown, or any suitable substitute therefor. In the kiln, the material is dried and calcined to drive off water, sulfur compounds, and any other volatile matter. The kiln is normally operated at a temperature between about nineteen hundred degrees Fahrenheit and twenty-six hundred to twenty-eight hundred degrees Fahrenheit.

Gases which result from the chemical reaction in the mixer and the den are conveyed through a conduit 6 to a combustion chamber 7. In the combustion chamber, the gases are burned to cause the chemical reaction:

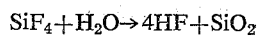

to go substantially to completion. It is to be noted that the use of this combustion chamber, at this point in the process, is not essential in order to cause the above chemical reaction to take place. As is shown in the drawing, the gases from the kiln are passed through a conduit 8 and combined with the gases resulting from the chemical reaction in the mixer and the den. Preferably, the major amount of solid material in the gas stream from the kiln is removed in a cyclone dust collector 12, before the gas stream is combined with the gases from the den. Inasmuch as these kiln gases are the major gas stream, and are at an elevated temperature, generally in excess of about fifteen hundred degrees Fahrenheit, there is a sufficient amount of heat present to raise the temperature of the combined gas streams to any desired level, thus effecting the substantially complete reaction of the $SiF_4$ to $SiO_2$. It is for this reason that the combustion chamber for the purpose of supplying heat to the gases resulting from the chemical reaction in the mixer and the den, is not essential in the process.

This combustion chamber 7 does, however, serve another function in addition to merely supplying heat to the gas stream. As has been pointed out heretofore, the gas stream being treated will usually contain sulphur dioxide ($SO_2$), silicon tetrafluoride ($SiF_4$), fluosilicic acid ($H_2SiF_6$), hydrogen fluoride (HF), steam ($H_2O$), carbon dioxide ($CO_2$), air as well as possible traces of carbon monoxide (CO) and sulphur trioxide ($SO_3$). Other volatile materials may also be present, as, for example, hydrocarbon gases, in the case where alkylation sulfuric acid has been used in the mixer. In addition to the gaseous compounds, solid materials in suspension, are also present, including calcium phosphates in various forms such as tricalcium phosphates, dicalcium phosphates, monocalcium phosphates, and, perhaps, such materials as pyro- and meta-phosphates as well. Also present are silicon dioxide ($SiO_2$), as well as other silicon bearing materials. Of all these components in the gas stream, the organic hydrocarbon gases present are extremely objectionable because of their extremely malodorous nature, and, accordingly, are desirably removed from the gas stream as early as possible in the treating process. By passing the reaction gases from the mixer and the den through a combustion chamber, these malodorous components in the gas stream are destroyed.

It has further been found that where a combustion chamber is used in the present process to destroy malodorous organic substituents in the gas stream, it is preferable to operate the combustion chamber so that the combustion which takes place is not complete. By limiting the supply of air in the combustion chamber so that, although the bad odor is removed, complete combustion of the fuel gas and malodorous organic substituents is not obtained, a carbonaceous residue is left in the gas stream, which residue is in the form of an agglomerated dust of sufficient particle size as to settle in comparatively large proportions to the bottom of the incinerator chamber. Moreover, the siliceous residue from the decomposition of fluorine compounds present in the gas is also largely included in this agglomerated carbonaceous residue instead of passing on through the combustion chamber to be combined with the kiln gas. This, of course, greatly reduces the amount of solids which must be subsequently removed from the gas stream by passing it through suitable removal apparatus as, for example, an electrostatic precipitator.

It will, of course, be appreciated that it is not essential to the operation of the present process that a portion of the suspended solid impurities in the gas stream be removed prior to passing the gas through the electrostatic precipitator. Accordingly, where there are no malodorous organic substituents in the gas stream, the use of the combustion chamber in the process can be eliminated.

The gases from the kiln, mixed with materials which are driven from the material being calcined are combined in a conduit 9 with the gases which result from the chemical reaction in the mixer and the den. Where the gases from the mixer and the den are passed through a combustion chamber, the combination with the kiln gases takes place after passage through the combustion chamber. Where no combustion chamber is used, the two gas streams may be combined at any point after the gases leave the den. It is at this point in the process, i.e., after the two gas streams have been combined, that the total gas stream is conditioned so as to adjust the temperature, water concentration and total fluorine concentration in the gas stream to obtain the desired HF to $SiF_4$ ratio. The temperature adjustment may be achieved by conserving the original heat in the gas as by insulation of the lines, or by supplying heat from an external source. The latter may be done by passing the gas through the heat exchanger or by injecting a burner fuel into the gas stream. The total fluorine concentration in the gas may be adjusted by adding an inert gas to the main gas stream until the desired fluorine concentration is reached. Preferably, this is done by injecting a burning mixture of fuel and air in the gas stream, which mixture is balanced so as to maintain the desired temperature and reach the proper dilution. Similarly, with the water concentration, steam may be added to the gas stream to reach the desired water concentration, along with sufficient heat to maintain the temperature. These additions to the gas stream are made through a suitable conduit or conduits, indicated generally as 10.

Accordingly, it is preferred to condition the gas stream by increasing the temperature, and/or diluting the fluorine concentration with inert gas, and/or adding water so that a stable recycle stream of fluoride liquid is returned to the process, the fluorine values present in the gas stream at the point of the silica removal being such that there will be a molar ratio of HF to $SiF_4$ of at least about 5:1 and, preferably, at least about 25:1. Once the combined gas stream has been so conditioned, i.e., the gas stream from the mixer and den and the gas stream from the kiln, this combined gas stream is passed to an electrostatic precipitator 11.

In the electrostatic precipitator, voltage is applied across a space through which the gaseous material and suspended solids therein are passed. The electrostatic field causes the particles to become charged and to be attracted to an electrode of the electrostatic precipitator. The operation of electrostatic precipitators being sufficiently well known in the art, a further description of this apparatus is not deemed to be necessary. Substantially, all of the solid material is removed from the gas stream in the electrostatic precipitator, and is discharged therefrom, either continuously or intermittently. If desired, this dust, as such, or after being combined with the dust recovered from the cyclone 12 may be recycled to the mixer, as part of the initial reaction mixture 1 or to the kiln 5. Alternatively, of course, the dust collected from the elastrostatic precipitator, as well as that from the combustion chamber and the cyclone, may be discarded.

After passing through the electrostatic precipitator 11, the gas stream is passed by means of a conduit 13 to an absorption tower 14, which tower is made up of a scrubbing section 15 and a desuperheating section 16. As is indicated schematically in FIGURE 1, these two sections of the absorption tower are shown as being separate. It is to be understood, however, that such an arrangement is not essential to the present process, and that the two sections may be combined in a single tower. The scrubbing section may be of any design which will furnish a sufficient number of transfer units or plates to obtain the desired separation and concentration of hydrogen fluoride and silicon tetrafluoride. Similarly, the desuperheating portion of the absorption tower may be of diverse design, as, for example, a spray chamber, and eductor type scrubber, or a short section of packed tower irrigated with a large recirculating liquid flow. Any design, either as a separate unit or as a part of the scrubbing section, which will serve to saturate the incoming gas with water vapor and evaporate substantially all of the liquid coming from the scrubbing section of the tower will be satisfactory.

As shown in FIGURE 1, the scrubbing liquid is introduced into the top of the absorption tower through conduit 17, where it is passed through the tower countercurrent to the gas stream which is to be scrubbed. Most of the water or scrubbing liquid runs from the bottom of the scrubbing section into the desuperheating section of the absorption tower. Within the desuperheating section of the tower, the incoming gas stream at a high temperature, e.g., nine hundred degrees Fahrenheit, is saturated with water vapor and substantially all of the liquid is evaporated. In this manner, the sensible heat of the incoming gas stream is used to effect a fractionation of the liquid products, so that a relatively concentrated solution of hydrofluoric acid is withdrawn through a conduit 19 from an intermediate point in scrubbing section of the tower. The gases passing through the tower to the conduit 20 are substantially free of hydrogen fluoride and may then be released to the atmosphere, or as is shown in FIGURE 1, directed to an additional processing step to recover $SO_2$ contained in the gas. In this instance, as is shown generally in the drawing, the gas stream is passed through a condenser 20a wherein a major portion of the $H_2O$ in the gas is condensed, recovered and returned to conduit 17 through the conduit 20b, to be used as part or all of the scrubbing liquor for the tower. It is, of course, obvious that where the amount of $H_2O$ thus obtained is insufficient in the scrubbing operation, additional $H_2O$ can be added from any other suitable source. The condenser 20a can be of any suitable type, e.g., either a direct or indirect contact type heat exchanger.

The fluosilicic acid rich solution recovered from the bottom of the desuperheating section of the tower may then be recycled to an earlier point in the process, preferably to the den, or alternatively, to the mixer. The concentrated aqueous solution of hydrofluoric acid, having a concentration up to that of the azeotrope, and generally about twenty-five to thirty-five percent is then sent to an additional processing step, wherein a substantially anhydrous HF gas is recovered.

Figure 2:
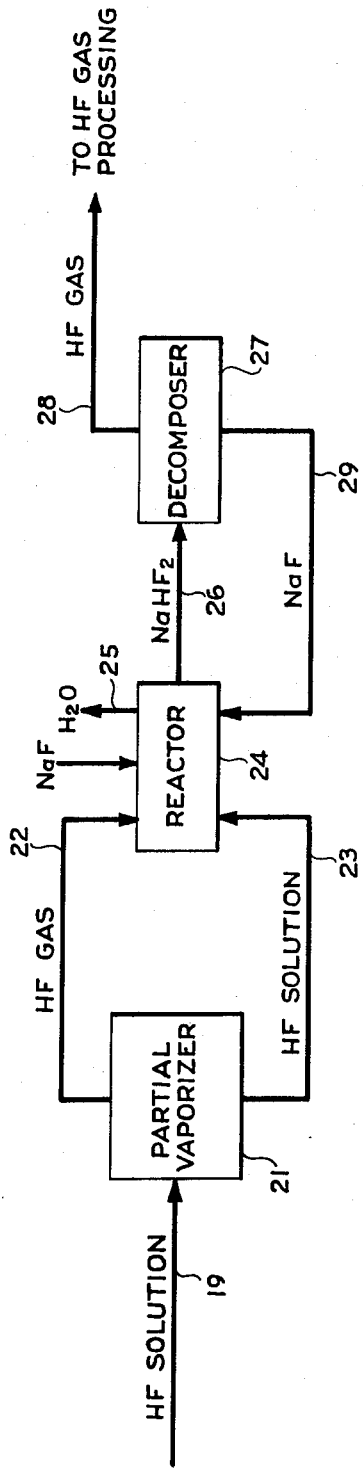
FIGURE 2 is a schematic representation of a flow process of one preferred embodiment for converting the concentrated HF solution to HF gas in a salable form.

Considering now FIGURE 2 of the drawing, this is a schematic representation of one process for recovering substantially anhydrous HF gas from the concentrated aqueous hydrofluoric acid solution obtained from the adsorption tower. In this process, the hydrofluric acid solution is passed through the conduit 19 to a vaporizer 21 wherein a portion of the solution is vaporized. The combined vapor and hot liquid feed from the vaporizer is then passed through conduits 22 and 23 to a reactor 24 in which is contained a bed of sodium fluoride. The sodium fluoride in the reactor is preferably in finely-divided granular form, and the reactor is preferably equipped with means to cause agitation of the sodium fluoride bed so as to cause movement thereof from the head end of the reactor to the exit end. The proportion of liquid feed to vapor feed to the reactor is adjusted so as to maintain a steady temperature within the reactor in excess of about one hundred degrees centigrade, preferably within the range of about one hundred and fifteen to one hundred and twenty-five degrees centigrade. Under these conditions, solid sodium bifluoride is formed within the reactor and water is evolved as steam and passed from the reactor through vent 25. During the reaction, an excess of sodium fluoride is maintained within the reactor.

The solids from the reactor, which now contain sodium bifluoride, as well as sodium fluoride, are conveyed through conduit 26 from the absorption reactor 24 to a decomposition furnace 27. This furnace is preferably equipped so as to agitate the bed of solids and move it to the furnace exit while heating it. Generally, it is preferred to use an external heat source in this operation. Within the furnace, the sodium bifluoride is heated to a temperature which is, preferably, in excess of about three hundred degrees centigrade. In this manner, the sodium bifluoride present is decomposed to solid sodium fluoride and hydrogen fluoride gas. The hydrogen fluoride gas is found to be substantially pure and free of water, and is then conducted through the conduit 28 to appropriate stills and condenser systems (not shown) for recovery of liquid anhydrous hydrogen fluoride product. The hot solid sodium fluoride obtained from the decomposer is returned through the conduit 29 to the absorption reactor 24 to be further contacted with the combined vapor and hot liquid feed of hydrogen fluoride.

Figure 3:
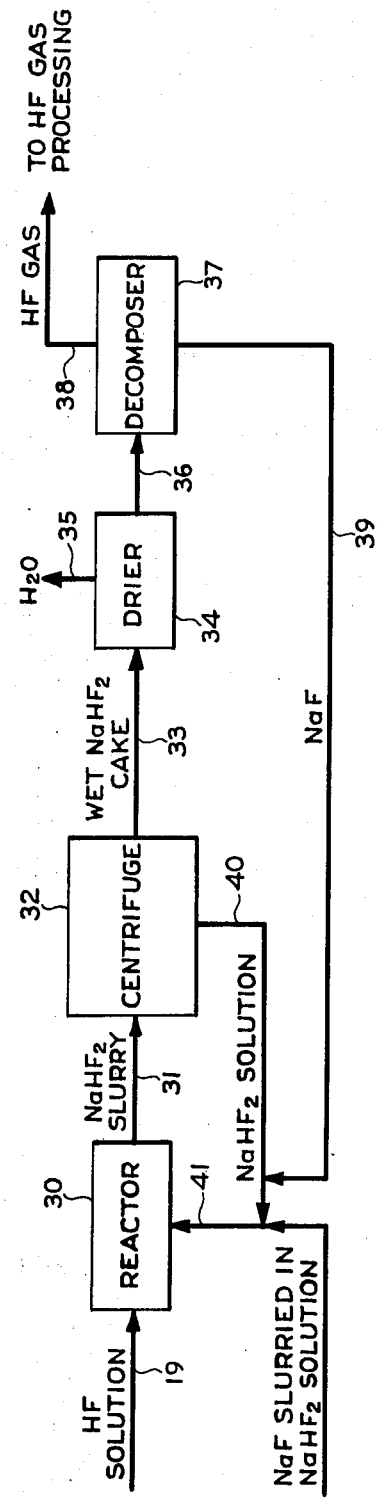
FIGURE 3 is a schematic representation of another flow system of preferred form for converting the concentrated HF solution to HF gas in salable form.

Considering now FIGURE 3, this is a schematic flow diagram of a second process which may be used to recover substantially anhydrous hydrogen fluoride from the aqueous hydrogen fluoride solution from the absorption tower. In this process, the concentrated aqueous hydrofluoric acid solution is passed through the conduit 19 to a reactor 30 wherein it is reacted with a slurry of sodium fluoride in a sodium bifluoride solution. From the reactor 30, a slurry of sodium bifluoride is obtained, which slurry is directed through conduit 31, to a centrifuge 32.

In the centrifuge, a wet cake of sodium bifluoride is obtained, which material is washed free of any soluble impurities. From the centrifuge, the wet sodium bifluoride passes through conduit 33 to a drier 34, wherein the sodium bifluoride cake is heated at a temperature below the decomposition temperature, to drive off the water, through vent 35. The thus dried sodium bifluoride cake is then passed through conduit 36 to a decomposer 37 wherein it is heated to a temperature, preferably, in excess of three hundred degrees centigrade, so as to evolve a substantially dry and pure HF gas and solid sodium fluoride. The thus obtained HF gas is directed through the conduit 38 to additional processing to obtain substantially anhydrous liquid HF. The solid sodium fluoride which is recovered from the decomposer is recycled through the conduits 39, 40 and 41, to the reactor where it is slurred with the sodium bifluoride solution recycled from the centrifuge.

In order that those skilled in the art may better understand the process of the present invention and the manner in which it may be practiced, the following specific examples are given:

*Example 1*

In order to show the effect of the total fluorine concentration in the gas stream, a series of runs are made using the process shown in FIGURE 1 of the drawing. The gas stream which is treated in these runs is at a temperature of eight hundred degrees Fahrenheit and is obtained from the acidulation of phosphate rock using alkylation sulfuric acid, phosphoric acid and water. The following results are obtained:

| Run | Percent by Volume in Gas | | |
|---|---|---|---|
| | Total F (Calculated as HF) | $H_2O$ | $HF/SiF_4$ (moles) at Equilibrium |
| A | 3.9 | 35 | 3.9 |
| B | 1.0 | 17 | 11.8 |
| C | 0.9 | 32 | 25.5 |
| D | 0.4 | 28 | 23.0 |

From these results, it is clearly seen that as the total fluorine concentration of the gas stream is reduced, the molar ratio of HF to $SiF_4$ is increased. As is shown in Run B, when the total fluorine in the gas stream is reduced from about 3.9 percent by volume to 1.0 percent by volume there is an increase in the HF to $SiF_4$ molar ratio even though the total water concentration of the gas has also been reduced.

*Example 2*

To further illustrate the effect of the total fluorine concentration in the gas stream, a second series of runs are made using the process as shown in FIGURE 1 of the drawing, and a gas stream as described in Example 1, containing twenty-five percent by volume of water. In these runs, different temperatures were used and the total fluorine concentrations of the gas to give HF to $SiF_4$ molar ratios of 25:1, 50:1, and 100:1 are determined. Using this procedure, the following results are obtained:

| Run | Gas Temp., °F. | Percent F by Volume (Calculated as HF) When $HF/SiF_4$ (moles) is— | | |
|---|---|---|---|---|
| | | 25/1 | 50/1 | 100/1 |
| A | 1,000 | 2.7 | 2.0 | 1.5 |
| B | 900 | 1.7 | 1.2 | 1.0 |
| C | 800 | 1.0 | 0.76 | 0.60 |
| D | 700 | 0.28 | 0.20 | |

From these results, it is apparent that a slight decrease in the concentration of the total fluorine, as, for example, a decrease in the level giving a 50:1 ratio of HF to $SiF_4$, results in a large increase in that ratio, i.e., to 100:1.

*Example 3*

To illustrate the effect of water concentration on the molar ratio of HF to $SiF_4$ in the gas stream, a series of runs are made using the procedure and gas stream of Example 1, with the exception that the total fluorine concentration in the gas stream, expressed as HF, is 1.0 percent by volume. Using this procedure, the following results are obtained:

| Run | Percent Vol. $H_2O$ | Mole Ratio $HF/SiF_4$ | | |
|---|---|---|---|---|
| | | 800° F. | 900° F. | 1,000° F. |
| A | 1.0 | 1.4 | | |
| B | 5.0 | 4.5 | | |
| C | 10.0 | 8.5 | | |
| D | 15.0 | 13.0 | 38 | |
| E | 25.0 | 25.0 | 89 | 304 |
| F | 35.0 | 41.0 | 121 | |

From these runs, it is seen that increases in the total water concentration of the gas stream result in increases in the HF to $SiF_4$ ratio in the gas at each of the temperatures used, i.e., eight hundred degrees, nine hundred degrees and one thousand degrees Fahrenheit.

*Example 4*

In order to show the effect of the addition of the recycle stream on the present process, a series of runs are made using the procedure of Example 1, wherein the fluorosilicic acid solution obtained from the bottom of the absorption tower is continuously recycled to the den. The recycle liquid has a composition of a twenty-five percent solution of fluosilicic acid containing an eleven percent hydrofluoric acid solution. The water content of the gas used is twenty-five percent by volume. Using this procedure, the following results are obtained after steady state conditions have been reached.

| Run | Total F Concentration in Gas (Expressed as HF) Before Recycle | Lbs. HF Product/10 Lbs. Equivalent HF Recycle at— | | |
|---|---|---|---|---|
| | | 800° F. | 900° F. | 1,000° F. |
| A | 1.0% (vol.) | 0 | 61 | 320 |
| B | 1.5% (vol.) | | 0 | 81 |
| C | 2.0% (vol.) | | | 20 |

As is seen from these results, as the total fluorine concentration in the gas stream before recycle is increased at constant water concentration, there is a decrease in the amount of HF product recovered, in terms of the HF present in the recycle stream. This illustrates the necessity for maintaining the total fluorine concentration in the gas stream before recycle at as low a value as is possible, commensurate with efficient scrubbing operations.

*Example 5*

To further illustrate the effect of recycling the fluosilicic acid stream back into the process, an additional series of runs are made illustrating the effect of various amounts of recycle at various temperatures in terms of the total fluorine concentration and HF to $SiF_4$ ratio in the gas stream both before and after recycle. In these runs, the water concentration of the gas and the composition of the recycle liquid were the same as that used in Example 4. Similarly, the process followed is the same as that of Example 4. Using this procedure, the following results are obtained:

| Run | Lbs. HF Product/10 Lbs. Equivalent HF Recycle | Gas Temp., °F. | Gas Composition | | | |
|---|---|---|---|---|---|---|
| | | | Before Recycle | | After Recycle | |
| | | | Percent (vol.) Total F (as HF) | HF/SiF$_4$ | Percent (vol.) Total F (as HF) | HF/SiF$_4$ |
| A | 0 | 800 | <1.0 | >25 | | 5.1 |
| B | 0 | 900 | 1.35 | 34 | | 5.1 |
| C | 0 | 1,000 | 2.2 | 36 | | 5.1 |
| D | 25 | 900 | 1.20 | 52 | 1.6 | 28.0 |
| E | 25 | 1,000 | 1.95 | 48 | 2.5 | 28.0 |
| F | 90 | 900 | .92 | 115 | 1.0 | 87.0 |
| G | 90 | 1,000 | 1.44 | 100 | 1.6 | 87.0 |

From these results, it is seen that when a stable recycle condition is used, there is an increase in the total fluorine concentration in the gas stream, and a decrease in the HF to SiF$_4$ ratio. It is further seen that where the stable recycle is established so that a larger amount of HF product is recovered, compared with that which is recycled, the resulting ratio of HF to SiF$_4$ in the gas stream, after recycle has been added, has increased.

*Example 6*

Using the process as shown in FIGURE 1 of the drawings, a gas stream is introduced into the electrostatic precipitator, which gas stream has the following composition:

| | Moles |
|---|---|
| Inert material (N$_2$, O$_2$, and CO$_2$) | 73.00 |
| Steam | 23.00 |
| Sulphur dioxide | 3.0 |
| Hydrogen fluoride | 0.74 |
| Silicon tetrafluoride | 0.05 |

In addition, this gas stream contains 0.22 pound of dust per 1000 cubic feet of gas. The gas is at a temperature of nine hundred degrees Fahrenheit as it is introduced into the electrostatic precipitator. In passing through the electrostatic precipitator, better than ninety-nine percent (by weight) of the dust is removed from the gas stream, thus leaving the gas stream substantially dust-free. With the temperature of the gas stream still maintained at about nine hundred degrees Fahrenheit, the gas stream is introduced into the desuperheating section of the absorption tower. Into the top of the absorption tower, water is introduced at the rate of about 36.4 moles of water per 100 moles entering gas. The water flows downwardly through the tower countercurrent to the flow of the gas stream. This quantity of water is sufficient to effect a reduction in the temperature of the gas stream from about nine hundred degrees Fahrenheit to about one hundred and seventy-five degrees Fahrenheit, and absorption of the fluorine and silica values in the gas stream is obtained, with a separation and concentration of these values by means of fractionation, caused by the sensible heat of the incoming gas stream. From the desuperheating section of the absorption tower, there is withdrawn a fluosilicic acid solution having the following composition:

| | Mole |
|---|---|
| Fluosilicic acid | 0.05 |
| Hydrofluoric acid | 0.155 |
| Water | 0.86 |
| Sulphur dioxide | Trace |

From an intermediate portion in the scrubbing tower, an aqueous solution of hydrofluoric acid is withdrawn having the following composition:

| | Moles |
|---|---|
| Hydrofluoric acid | 0.475 |
| Water | 1.540 |
| Sulphur dioxide | Trace |

This solution has an HF weight concentration of about twenty-five percent. In addition, the gases leaving the scrubbing section of the absorption tower have the following composition:

| | Moles |
|---|---|
| Inert material (N$_2$, O$_2$, and CO$_2$) | 73.00 |
| Steam | 57.00 |
| Sulphur dioxide | 3.00 |
| Hydrogen Fluoride | 0.01 |

It is seen that the gases which pass through the absorption tower are substantially free from any fluorine values, and, with the exception of the sulphur dioxide, contain no other substituent which might be objectionable if the gas stream is evented to the atmosphere. The sulphur dioxide can, of course, be removed from this gas stream by any one of numerous processes known in the art for this purpose.

*Example 7*

To illustrate the recovery of hydrogen fluoride from an aqueous hydrogen fluoride solution, a solid mass containing one hundred and thirty grams of sodium fluoride and fifteen grams of sodium bifluoride, at a temperature of two hundred and eighty degrees centigrade, is conveyed into an absorption reactor. One hundred and three grams of a thirty percent aqueous hydrofluoric acid solution, prepared in the manner as set forth in Example 6, is fed into a vaporizer. Thirty-six grams of the solution is vaporized and fed to the absorption reactor at one hundred and twenty-five degrees centigrade. The balance of the solution, sixty-seven grams of liquid thirty percent HF, is fed to the reactor at one hundred degrees centigrade. After the contact of the gas and the solid is complete, i.e., when about ninety percent of the HF is absorbed, the bed temperature is at about one hundred and twenty-five degrees centigrade. The bed now contains one hundred and five grams of sodium bifluoride, seventy-one grams of sodium fluoride, and less than 0.1 percent by weight of water. The outgoing gas stream from the reactor, at a temperature of about one hundred and twenty-five degrees centigrade, contains about three grams of hydrogen fluoride and seventy-two grams of water. The bed of material from the reactor is then transferred to a decomposition furnace where it is treated at a temperature of about two hundred and eighty degrees centigrade. About twenty-eight grams of hydrogen fluoride is evolved as a gas, which hydrogen fluoride is then removed for further purification and condensation to produce anhydrous liquid HF, in a manner well known to the art. The remaining solid materials from the decomposition furnace, which materials are predominantly NaF, are returned to the absorption reactor as part of the initial charge.

*Example 8*

To illustrate an alternative procedure for recovering the HF from the aqueous hydrofluoric acid solution, sixty-three grams of sodium fluoride is added to one hundred and twenty-five grams of sodium bifluoride solution containing one hundred and seventeen grams of water and eight grams of sodium bifluoride. The resulting mixture is a slurry which contains solid sodium fluoride and sodium bifluoride, and a solution which is about four percent sodium fluoride and about one percent sodium bifluoride. This slurry is mixed with one hundred grams of a thirty percent aqueous hydrofluoric acid solution, as produced in the method set forth in Example 6, while solution is at a temperature of about seventy-five degrees centigrade. The slurry resulting from the addition of the hydrofluoric acid solution contains about one hundred and one grams of sodium bifluoride and about one hundred and forty grams of water. The slurry is permitted to stand in a crystallizing unit for a period of about one-half to three hours, after which time it is centrifuged. A solid cake is recovered having a moisture content of about twenty percent, which cake contains about ninety-three grams of sodium bifluoride and twenty-three grams of water. The filtrate recovered from the centrifuge step contains about one hundred and seventeen grams of water and eight grams of sodium bifluoride. This material is recycled for admixture with solid sodium fluoride to be used in forming the initial reaction slurry. The resulting cake is then dried to give ninety-three grams of sodium bifluoride. This sodium bifluoride is then decomposed at a temperature of about two hundred and eighty degrees centigrade, yielding thirty grams of hydrogen fluoride gas and sixty-three grams of sodium fluoride. The sodium fluoride obtained is recycled in the process to be used in making up the initial reaction slurry. The hydrogen fluoride gas recovered is then subjected to additional processing, as is well known in the art, to produce a substantially anhydrous liquid HF.

While there have been described various embodiments of the invention, the methods described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

We claim:

1. A process for treating a gas stream containing minor amounts of fluorine values, silica values, and suspended solid impurities which comprises adjusting the temperature of the gas so that it is in excess of about three hundred degrees Fahrenheit, adjusting the total fluorine concentration in the gas so that it is in excess of about 0.05 percent by volume of the gas, adjusting the water concentration in the gas so that it is less than about seventy-five percent by volume in the gas, the above adjustments being correlated so that a molar ratio of HF to $SiF_4$ in the gas is at least 5:1, separating substantially all of the suspended solid impurities from the gas stream, while maintaining the adjusted temperature, water concentration and total fluorine concentration with no variation which would result in a substantial reduction of the HF to $SiF_4$ ratio obtained, thereafter separating the fluorine values in the gas from the major portion of the gas by scrubbing the gas with an aqueous solution, utilizing the sensible heat of the gas to form a concentrated solution of hydrogen fluoride, and recovering the thus-formed hydrogen fluoride solution.

2. The processes claimed in claim 1 wherein the HF to $SiF_4$ molar ratio, at the time the suspended solid impurities are removed from the gas, is at least 25:1, the adjusted gas temperature is at least eight hundred degrees Fahrenheit, the total fluorine concentration is at least 0.5 percent by volume, and the total water concentration is within the range of about twenty to thirty percent by volume.

3. A method for recovering hydrogen fluoride from waste gas mixtures obtained from processes of acidulation and/or calcination of phosphatic minerals, which waste gases contain fluorine values, silica values and suspended solid impurities, which comprises obtaining a molar ratio of HF to $SiF_4$ in the gas mixture of at least 5:1 by adjusting the gas temperature so that it is in excess of about three hundred degrees Fahrenheit, adjusting the total fluorine concentration in the gas, so that it is in excess of about 0.05 percent by volume of the gas, and adjusting the water concentration in the gas so that it is within the range of about five to seventy-five percent by volume of the gas, separating substantially all of the suspended solid impurities from the gas, while maintaining a HF to $SiF_4$ ratio in the gas of at least 5:1, passing the gas thus freed from suspended solid impurities to an absorption tower, countercurrently contacting said gas in said tower with an aqueous scrubbing liquor, utilizing the sensible heat of the gas coming into the tower to effect a fractionation of the scrubbing liquor, removing a concentrated solution of fluosilicic acid from the bottom of the tower, obtaining a gas from the top of the tower, which is substantially free of fluorine values and silica values, and removing a concentrated aqueous solution of hydrogen fluoride from an intermediate portion of the tower.

4. The method as claimed in claim 3 wherein the molar ratio of HF to $SiF_4$ in the gas is at least 25:1.

5. The method as claimed in claim 4 wherein the aqueous solution of hydrogen fluoride obtained from an intermediate portion of the tower has a hydrogen fluoride concentration within the range of about twenty-five to thirty-five percent by weight.

6. The method as claimed in claim 5 wherein the aqueous hydrogen fluoride solution obtained is subjected to additional processing to obtain a gaseous hydrogen fluoride product.

7. The method as claimed in claim 6 wherein the additional processing comprises admixing the aqueous hydrogen fluoride solution with a slurry of an alkali metal fluoride to form an alkali metal bifluoride slurry, recovering a solid alkali metal bifluoride from said slurry, removing water from the thus-recovered alkali metal bifluoride, heating the thus-dried alkali metal bifluoride to a temperature above its decomposition temperature to obtain solid alkali metal fluoride and hydrogen fluoride gas and recovering the hydrogen fluoride gas thus produced.

8. The method as claimed in claim 7 wherein the alkali metal fluoride and the alkali metal bifluoride are sodium fluoride and sodium bifluoride, respectively.

9. A process for treating a gas containing minor amounts of fluorine values, silica values, and suspended solid impurities, comprising adjusting the temperature of the gas to above 300 degrees Fahrenheit, adjusting the water concentration of the gas to between 5 and 75 percent by volume of the gas, and adjusting the total fluorine concentration in the gas to above 0.05 percent by volume of the gas so as to obtain a high mole ratio of HF to $SiF_4$ in the gas, separating the suspended solid impurities from the gas, maintaining the adjusted conditions of temperature, water concentration and total fluorine concentration in the gas to retain the high mole ratio of HF to $SiF_4$, separating the fluorine values in the gas stream from the major portion of said gas by scrubbing the gas with an aqueous solution, absorbing and concentrating the HF and $SiF_4$ in said scrubbing solution while utilizing the sensible heat of the gas to separate the absorbed HF and $SiF_4$ substituents to form a separate, concentrated solution of hydrogen fluoride and recovering the thus formed hydrogen fluoride solution.

10. The process of claim 9 wherein the mole ratio of HF to $SiF_4$ in the gas mixture is at least 5:1 at the time the suspended solid impurities are removed from the gas mixture, and this mole ratio is obtained by the use of at least one of the steps of increasing the gas mixture temperature and increasing the water concentration in the gas mixture, thereby decreasing the silicon tetrafluoride concentration in the gas mixture.

11. A method for recovering hydrogen fluoride from waste gas mixtures obtained from phosphate mineral acidulation and calcination processes comprising adjusting the temperature of a gas containing a minor proportion of fluorine values to above 300 degrees Fahrenheit, adjusting the water concentration of the gas to between 5 and 75 percent by volume of gas, and adjusting the total fluorine concentration in the gas to above 0.05 percent by volume of the gas, so as to obtain a high mole ratio of HF to $SiF_4$ in the gas, separating substantially all of the suspended solid impurities from the gas, maintaining the adjusted conditions of temperature, water concentration, and total fluorine concentration in the gas to retain the high mole ratio of HF to $SiF_4$, thereafter, separating the fluorine values in the gas stream from the major portion of said gas by scrubbing the gas with an aqueous solution, absorbing and concentrating the HF and $SiF_4$ in said scrubbing solution while utilizing the sensible heat of the gas to separate the absorbed HF and $SiF_4$ constituents to form a separate, concentrated solution of hydrogen fluoride and recovering the thus formed hydrogen fluoride solution.

References Cited by the Examiner
UNITED STATES PATENTS

| | | | |
|---|---|---|---|
| 1,720,965 | 7/1929 | Moller et al. | 23—153 |
| 1,960,347 | 5/1934 | Osswald et al. | 23—153 |
| 2,588,786 | 3/1952 | Winter | 23—153 |
| 2,819,151 | 1/1958 | Flemmert | 23—153 X |
| 3,004,829 | 10/1961 | Boyle et al. | 23—153 |

FOREIGN PATENTS

| | | |
|---|---|---|
| 387,614 | 2/1933 | Great Britain. |

MAURICE A. BRINDISI, *Primary Examiner.*